US012761336B2

(12) United States Patent
Andree et al.

(10) Patent No.: US 12,761,336 B2
(45) Date of Patent: Oct. 13, 2026

(54) SENSOR DEVICE FOR A MOTOR VEHICLE

(71) Applicant: Bayerische Motoren Werke Aktiengesellschaft, Munich (DE)

(72) Inventors: Helge Andree, Landshut (DE); Steffen Schadt, Erding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 511 days.

(21) Appl. No.: 18/033,644

(22) PCT Filed: Sep. 7, 2021

(86) PCT No.: PCT/EP2021/074544
§ 371 (c)(1),
(2) Date: Apr. 25, 2023

(87) PCT Pub. No.: WO2022/089818
PCT Pub. Date: May 5, 2022

(65) Prior Publication Data

US 2024/0019563 A1 Jan. 18, 2024

(30) Foreign Application Priority Data

Oct. 30, 2020 (DE) ..................... 10 2020 128 622.8

(51) Int. Cl.
*G01S 13/08* (2006.01)
*G01S 7/481* (2006.01)

(52) U.S. Cl.
CPC ............ *G01S 13/08* (2013.01); *G01S 7/4813* (2013.01)

(58) Field of Classification Search
CPC ............................... G01S 13/08; G01S 7/4813
See application file for complete search history.

(56) References Cited

U.S. PATENT DOCUMENTS 6,322,275 B1 * 11/2001 Schmidt ............... H01Q 1/3233 403/14
9,446,721 B2 9/2016 Jagoda
(Continued)

FOREIGN PATENT DOCUMENTS

DE 197 39 298 C1 11/1998
DE 199 43 293 A1 4/2001
(Continued)

OTHER PUBLICATIONS

International Search Report (PCT/ISA/210) issued in PCT Application No. PCT/EP2021/074544 dated Dec. 22, 2021 with English translation (four (4) pages).
(Continued)

*Primary Examiner* — Vladimir Magloire
*Assistant Examiner* — Eric K Hodac
(74) *Attorney, Agent, or Firm* — Crowell & Moring LLP

(57) ABSTRACT

A sensor device for a motor vehicle includes at least one holding frame, at least one securing device by which the holding frame is secured on at least one component of the motor vehicle stationarily relative to the at least one component, at least one first aligning unit for aligning the holding frame when it is being secured in a TARGET alignment, the first alignment unit comprising at least three contact points at which the holding frame contacts and abuts against the at least one component and/or a further component of the motor vehicle when in the secured arrangement, and at least one sensor which can be inserted into the holding frame and can be secured therein stationarily relative to the holding frame.

14 Claims, 2 Drawing Sheets

(56) References Cited

U.S. PATENT DOCUMENTS

| | | | |
|---|---|---|---|
| 2019/0126810 A1 | 5/2019 | Heimrath et al. | |
| 2020/0062277 A1* | 2/2020 | Kim | G01S 13/867 |

FOREIGN PATENT DOCUMENTS

| | | |
|---|---|---|
| DE | 10 2015 113 841 A1 | 2/2017 |
| DE | 10 2016 210 718 A1 | 12/2017 |
| DE | 10 2017 119 230 A1 | 2/2019 |
| WO | WO 2008/087320 A2 | 7/2008 |

OTHER PUBLICATIONS

German-language Written Opinion (PCT/ISA/237) issued in PCT Application No. PCT/EP2021/074544 dated Dec. 22, 2021 (five (5) pages).

German-language Search Report issued in German Application No. 10 2020 128 622.8 dated Jul. 22, 2021 with partial English translation (11 pages).

* cited by examiner

SENSOR DEVICE FOR A MOTOR VEHICLE

FIELD

The invention relates to a sensor device for a motor vehicle.

BACKGROUND AND SUMMARY

It is known from the prior art to arrange sensor devices on motor vehicles. The sensor devices can comprise, for example, so-called ACC radar sensors, i.e. sensors for distance control, which can be arranged, for example, on the front of a vehicle. When the motor vehicle is a tilting vehicle, the sensor device can be arranged, for example, below a diffuser lens.

In order to increase the road safety of the motor vehicle, precise positioning and orientation of the sensor are required. In the case of the known sensor devices for motor vehicles, the sensor devices are fixed on the vehicle in the course of manufacture on the assembly line and adjusted manually in terms of their orientation with the use of screws. This proves to be time-consuming.

An object of an exemplary embodiment of the invention is to propose a sensor device for a motor vehicle in which orientation of the sensor device on the motor vehicle is simplified.

This object is achieved by a sensor device for a motor vehicle, in particular for a tilting vehicle, with at least one retaining frame, with at least one fixing mechanism by means of which the retaining frame can be or is fixed immovably on at least one component of the motor vehicle relative to the at least one component, with at least one first orienting unit for orienting the retaining frame during fixing in a TARGET orientation, wherein the first orienting unit comprises at least three contact points at which the retaining frame bears with contact against the at least one component and/or a further part of the motor vehicle in the fixed arrangement, and with at least one sensor which can be inserted into the retaining frame and can be fixed immovably therein relative to the retaining frame.

Because the retaining frame bears, by means of the first orienting unit, with at least three contact points with contact against the component of the motor vehicle and/or a further part of the motor vehicle in the fixed arrangement, it is possible to omit subsequent adjustment of the retaining frame after attachment. Because the retaining frame bears at at least three contact points, its orientation is determined adequately geometrically. As a result, arrangement of the sensor device on the motor vehicle and adjustment of the orientation of the sensor device in a single common mounting step are enabled.

It is in principle conceivable that the retaining frame can be fixed on just a single component of the motor vehicle. Furthermore, the retaining frame can be fixed on multiple components of the motor vehicle.

In order to increase the accuracy of the orientation of the sensor device in the attached state, it can be provided by the first orienting unit that the retaining frame bears at at least four contact points or more than four contact points. At each contact point, the retaining frame can bear against the component or a further part of the motor vehicle with point, linear, or large-area contact.

The motor vehicle can comprise a tilting vehicle. A tilting vehicle is understood to include bicycles, motorcycles, or motor vehicles similar to motorcycles such as motor scooters, in particular two-, three-, or four-wheeled motor scooters, scooters, tiltable trikes, quad bikes, or the like.

In order to facilitate the mounting of the sensor device on the motor vehicle, the retaining frame can be attached via the fixing mechanism without the use of tools. In such cases, the retaining frame can, for example, be clipped onto the component. For this purpose, it proves to be advantageous if the fixing mechanism comprises at least one projection on the retaining frame which can be or is fixed in or on a socket of the at least one component, forming a rear grip with respect to a first attachment direction, and/or if the fixing mechanism comprises at least one projection on the at least one component which can be or is fixed in or on a socket of the retaining frame, forming a rear grip with respect to the first attachment direction.

The socket can be formed using any desired technique as long as it complies with the technical function of forming a rear grip in the attached arrangement with respect to the first attachment direction. The socket can be formed simply and cost-effectively if it has a hook-shaped design or comprises a recess into which the projection can engage and can be fixed, forming a rear grip.

The first orienting unit and the fixing mechanism can comprise parts which can be separated or are separate from one another. In such a case, the retaining frame can comprise a contact point on a first component of the motor vehicle and be fixed on a second component by the fixing mechanism. It proves to be advantageous if the first orienting unit is an element of the fixing mechanism and/or if the first orienting unit and the fixing mechanism comprise at least one identical common part.

In such a case, the retaining frame is fixed on the at least one component at at least three points. In such a case, the retaining frame is also oriented at the same time as the retaining frame is attached. As a result, the mounting of the sensor device on the motor vehicle is facilitated.

In order to ensure that even higher weights of the sensor can be absorbed by the retaining frame and be held during the operation of the motor vehicle, in a development of the sensor device the fixing mechanism comprises at least one screw- or bolt-shaped fixing device by means of which the retaining frame can be fixed, in particular additionally, on the at least one component or a further component of the motor vehicle.

The fixing device comprises in such a case an additional part. No orienting of the retaining frame takes place by virtue of the use of the screw- or bolt-shaped fixing device.

In order to further improve the orienting of the sensor device during the mounting, a development of the sensor device comprises at least one second orienting unit by means of which the sensor bears, in an attached arrangement, with contact against the retaining frame at at least three contact points.

Because the sensor bears with contact against the retaining frame at at least three contact points, the sensor can already be oriented with respect to the retaining frame when it is attached.

In developments of the sensor devices, the sensor can bear against the retaining frame by means of the second orienting unit at at least four contact points. The contact point can be designed with point, linear, or large-area contact.

The orienting of the sensor with respect to the retaining frame can be further improved if the sensor comprises, transversely to a second attachment direction in which the sensor can be arranged in the retaining frame, a cross-section which is designed so that it corresponds to, in particular complements, an opening of the retaining frame.

The sensor can be fixed in the retaining frame in any desired fashion. Arrangement of the sensor in the retaining frame can be simplified if the sensor device comprises at least one coupling mechanism by means of which the sensor can be or is fixed immovably relative to the retaining frame without the use of tools.

The coupling mechanism can be implemented, for example, fixing the sensor on the retaining frame by friction, a force fit, and/or a form fit. In a development of the aforementioned embodiment, it proves to be advantageous if the coupling mechanism comprises at least one projection on the retaining frame which can be or is fixed in or on a socket of the sensor, forming a rear grip with respect to the second attachment direction, and/or that the coupling mechanism comprises at least one projection on the sensor which can be or is fixed in or on a socket of the retaining frame, forming a rear grip with respect to the second attachment direction.

In such a case, the sensor can be firmly clipped into the retaining frame in a simple fashion. The socket in the retaining frame can have, for example, a hook-shaped design or comprise a recess.

The sensor device can be designed with a reduced number of parts if the second orienting unit is an element of the coupling mechanism and/or if the second orienting unit and the coupling mechanism comprise at least one identical common part.

In such a case, the sensor is also oriented with the fixing directly when the sensor is attached in the retaining frame. Mounting of the sensor device is further facilitated as a result.

Lastly, it proves to be advantageous if at least one of the at least one component comprises a diffuser lens or a headlight housing and/or if the sensor comprises a radar sensor, in particular a distance control sensor (ACC).

The diffuser lens can comprise a diffuser lens for a headlight of the motor vehicle, in particular the tilting vehicle.

If the at least one component comprises a diffuser lens, the sensor can be fixed so that it is oriented precisely with respect to the diffuser lens by the oriented retaining frame. As a result, the risk of undesired reflection of light in the direction of the sensor can be reduced.

The diffuser lens can also be arranged in a predefined arrangement on the motor vehicle. This can be effected, for example, by being mounted on a substructure on which the diffuser lens can be fixed and which is connected to a support structure of the motor vehicle. The component on which the retaining frame can be fixed can in such a case comprise the substructure on which the retaining frame can be fixed.

As a result, orienting of the retaining frame and the sensor relative to the diffuser lens is further improved.

It is moreover conceivable that the retaining frame bears with contact against the substructure at at least three contact points. In a development, the whole of the retaining frame can bear against the substructure in form-fitting fashion and with large-area contact.

In a further embodiment, the component can comprise a headlight housing. In such a case, the retaining frame can be oriented relative to a headlight.

Further features, details, and advantages of the invention can be found in the attached patent claims, the drawings, and the following description of a preferred embodiment of the sensor device.

DETAILED DESCRIPTION

Figure 1:
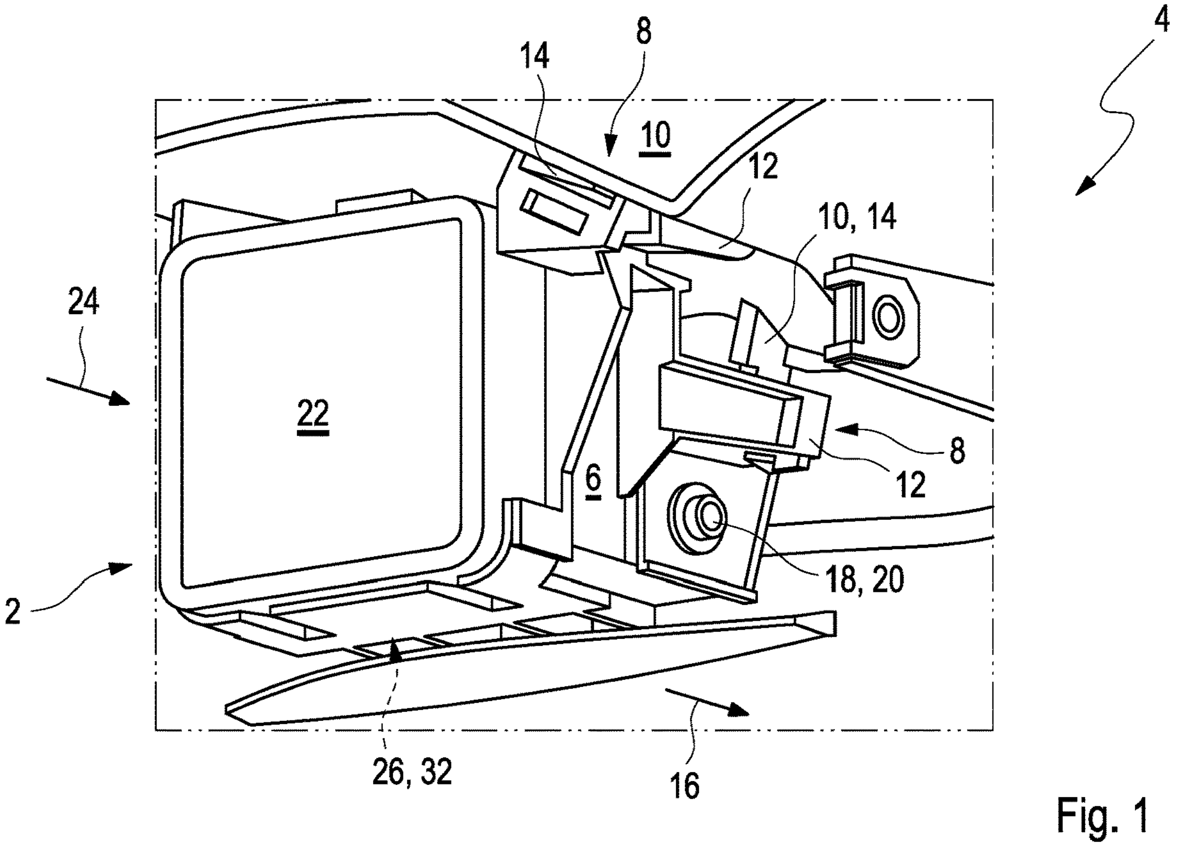
FIG. 1 shows a perspective selective front view of an exemplary embodiment of the sensor device.
Figure 2:
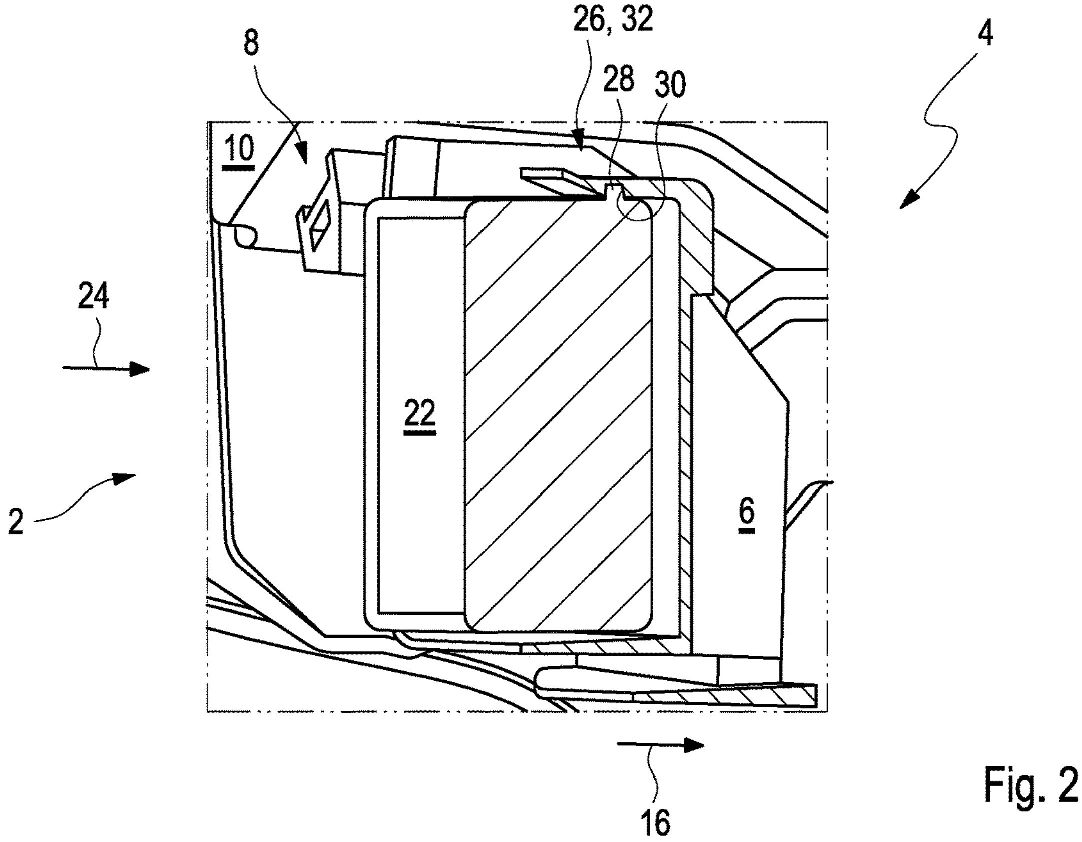
FIG. 2 shows a side view in section of the exemplary embodiment according to FIG. 1.
Figure 3:
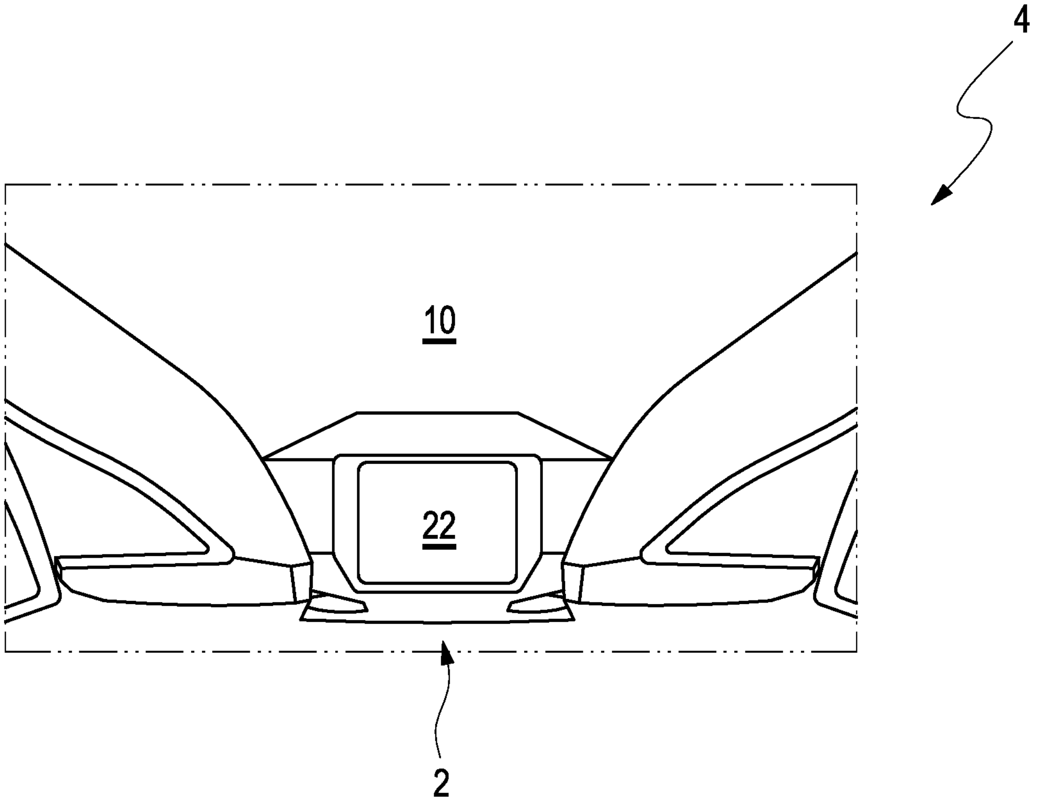
FIG. 3 shows a front view of the sensor device according to FIG. 1.

The Figures show a sensor device, provided as a whole with the reference sign 2, for a motor vehicle 4 (only partially illustrated in the Figures). The motor vehicle 4 shown comprises a tilting vehicle. The sensor device 2 comprises a retaining frame 6 and a fixing mechanism 8 by means of which the retaining frame 6 can be fixed immovably on at least one component 10 of the motor vehicle 4, relative to the component 10. In the exemplary embodiments shown in the Figures, the fixing mechanism 8 is formed at one fixing point by projections 12 on the retaining frame 6 and sockets 14 on the component 10 and at another fixing point by projections 12 on the component 10 and sockets 14 on the retaining frame 6. By virtue of these, the retaining frame 6 is fixed against removal by means of a rear grip with respect to a first attachment direction 16. In order to ensure that relatively high weights are absorbed by the fixing mechanism 8, the fixing mechanism 8 comprises screw- or bolt-shaped fixing device 18 by means of which the retaining frame 6 can be additionally fixed on the component 10.

Furthermore, in the exemplary embodiments shown in the Figures, a first orienting unit 20 is provided by means of which the retaining frame 6 can be fixed in a TARGET orientation during fixing. In the exemplary embodiments shown in the Figures, the first orienting unit 20 and the fixing mechanism 8 comprise identical common parts. By means of the first orienting unit 20, the retaining frame 6 bears at four contact points in the exemplary embodiments shown in the Figures. As a result, orientation of the retaining frame 6 at the same time as it is attached to the component 10 is enabled.

Furthermore, the sensor device 2 comprises a sensor 22 which can be inserted in a second attachment direction 24 into the retaining frame 6 and can be fixed therein. The sensor 22 comprises, transversely to the attachment direction 24, a cross-section which is designed so that it corresponds to, in particular complements, an opening in the retaining frame 6.

In order to fix the sensor 22 in the retaining frame 6, the sensor device 2 comprises a coupling mechanism 26 by means of which the sensor 22 can be fixed without the use of tools and immovably relative to the retaining frame 6. For this purpose, the coupling mechanism 26 comprises projections 28 on the sensor 22 which engage in sockets 30 of the retaining frame 6 during attachment and form a rear grip.

The sensor device 2 furthermore comprises a second orienting unit 32 by means of which the sensor 22 bears against the retaining frame 6 at four contact points.

The features of the invention which are disclosed in the above description, the claims, and the drawings can, both individually and in any desired combination, be essential in the realization of the invention in its different embodiments.

LIST OF REFERENCE SIGNS

2 sensor device
4 motor vehicle
6 retaining frame
8 fixing mechanism
10 component
12 projection of the fixing mechanism

14 socket of the fixing mechanism
16 first attachment direction
18 fixing device
20 first orienting unit
22 sensor
24 second attachment direction
26 coupling mechanism
28 projection of the coupling mechanism
30 socket of the coupling mechanism
32 second orienting unit

The invention claimed is:

1. A sensor device for a motor vehicle, comprising:

at least one retaining frame, further comprising at least one fixing mechanism configured to fix the retaining frame immovably on at least one component of the motor vehicle relative to the at least one component;

at least one first orienting unit configured to orient the retaining frame during fixing in a first orientation, wherein the at least one first orienting unit comprises at least three contact points at which the retaining frame bears with contact against the at least one component and/or a further component of the motor vehicle in a fixed arrangement; and at least one sensor configured to be inserted into the retaining frame and fixed immovably therein relative to the retaining frame, wherein the sensor comprises, transversely to a sensor attachment direction in which the sensor is inserted into the retaining frame, a cross-section which is designed so that it corresponds to and complements an opening of the retaining frame, wherein the at least one component of the motor vehicle comprises a diffuser lens, and wherein the sensor is fixed such that it is oriented precisely with respect to the diffuser lens by the retaining frame and such that the risk of undesired reflection of light in the direction of the sensor is reduced.

2. The sensor device according to claim 1, wherein the fixing mechanism comprises at least one projection on the retaining frame configured to be fixed in or on a socket of the at least one component of the motor vehicle, and configured to form a rear grip with respect to a first attachment direction.

3. The sensor device according to claim 1, wherein the fixing mechanism comprises a socket of the retaining frame configured to be fixed to at least one projection on the at least one component of the motor vehicle, and configured to form a rear grip with respect to a first attachment direction.

4. The sensor device according to claim 1, wherein the first orienting unit is an element of the fixing mechanism and/or in that the first orienting unit and the fixing mechanism comprise at least one identical common part.

5. The sensor device according to claim 1, wherein the fixing mechanism comprises at least one screw-shaped or bolt-shaped fixing device configured to fix the retaining frame on the at least one component of the motor vehicle or the further component of the motor vehicle.

6. The sensor device according to claim 1, further comprising:

at least one second orienting unit configured to bear the sensor in an attached arrangement with contact against the retaining frame at at least three contact points.

7. The sensor device according to claim 1, further comprising:

at least one coupling mechanism configured to immovably fix the sensor relative to the retaining frame without the use of tools.

8. The sensor device according to claim 7, wherein the at least one coupling mechanism comprises at least one projection on the retaining frame configured to be fixed in or on a socket of the sensor, forming a rear grip with respect to the sensor attachment direction.

9. The sensor device according to claim 7, wherein the at least one coupling mechanism comprises at least one projection on the sensor configured to be fixed in or on a socket of the retaining frame, forming a rear grip with respect to the sensor attachment direction.

10. The sensor device according to claim 7, wherein the coupling mechanism comprises a second orienting unit.

11. The sensor device according to claim 1, wherein the sensor comprises a radar sensor.

12. The sensor device according to claim 1, wherein the sensor comprises a distance control sensor.

13. A sensor device for a motor vehicle, comprising:

at least one retaining frame, further comprising at least one fixing mechanism configured to fix the retaining frame immovably on at least one component of the motor vehicle relative to the at least one component;

at least one first orienting unit configured to orient the retaining frame during fixing in a first orientation, wherein the at least one first orienting unit comprises at least three contact points at which the retaining frame bears with contact against the at least one component and/or a further component of the motor vehicle in a fixed arrangement; and at least one sensor configured to be inserted into the retaining frame and fixed immovably therein relative to the retaining frame by at least one coupling mechanism, wherein the at least one coupling mechanism comprises at least one projection on the retaining frame configured to be fixed in or on a socket of the sensor, forming a rear grip with respect to a sensor attachment direction in which the at least one sensor is inserted into the retaining frame, wherein the at least one component of the motor vehicle comprises a diffuser lens, and wherein the sensor is fixed such that it is oriented precisely with respect to the diffuser lens by the retaining frame and such that the risk of undesired reflection of light in the direction of the sensor is reduced.

14. A sensor device for a motor vehicle, comprising:

at least one retaining frame, further comprising at least one fixing mechanism configured to fix the retaining frame immovably on at least one component of the motor vehicle relative to the at least one component;

at least one first orienting unit configured to orient the retaining frame during fixing in a first orientation, wherein the at least one first orienting unit comprises at least three contact points at which the retaining frame bears with contact against the at least one component and/or a further component of the motor vehicle in a fixed arrangement; and at least one sensor configured to be inserted into the retaining frame and fixed immovably therein relative to the retaining frame by at least one coupling mechanism, wherein the at least one coupling mechanism comprises at least one projection on the at least one sensor configured to be fixed in or on a socket of the retaining frame, forming a rear grip with respect to a sensor attachment direction in which the at least one sensor is inserted into the retaining frame, wherein the at least one component of the motor vehicle comprises a diffuser lens, and wherein the sensor is fixed such that it is oriented precisely with respect to the diffuser lens by the retaining frame and such that the risk of undesired reflection of light in the direction of the sensor is reduced.

* * * * *